(No Model.) 2 Sheets—Sheet 1.
N. TESLA.
METHOD OF CONVERTING AND DISTRIBUTING ELECTRIC CURRENTS.
No. 382,282. Patented May 1, 1888.
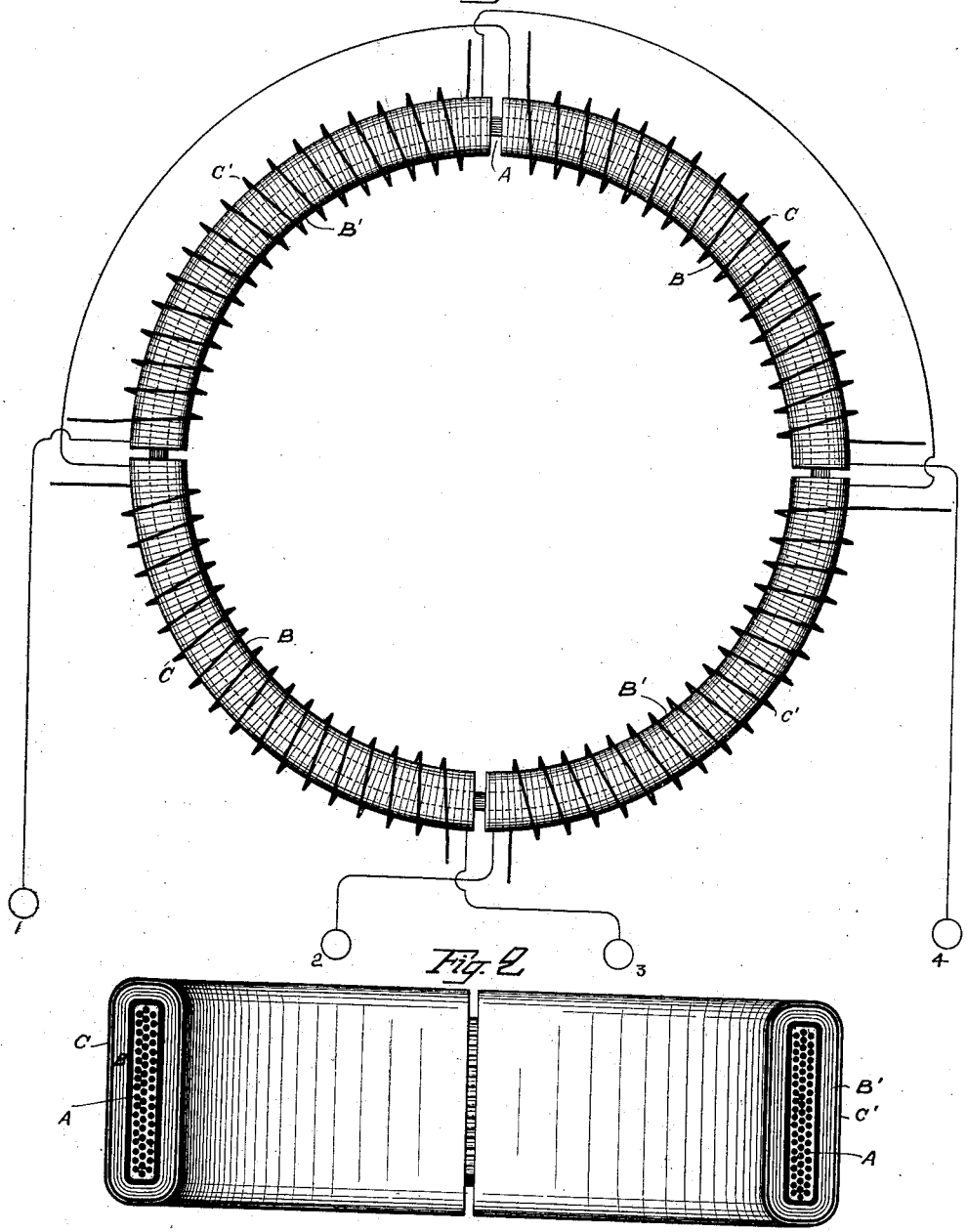
WITNESSES:
Raphaël Netter
Frank B. Murphy
INVENTOR
Nikola Tesla
BY
Duncan, Curtis & Page
ATTORNEYS

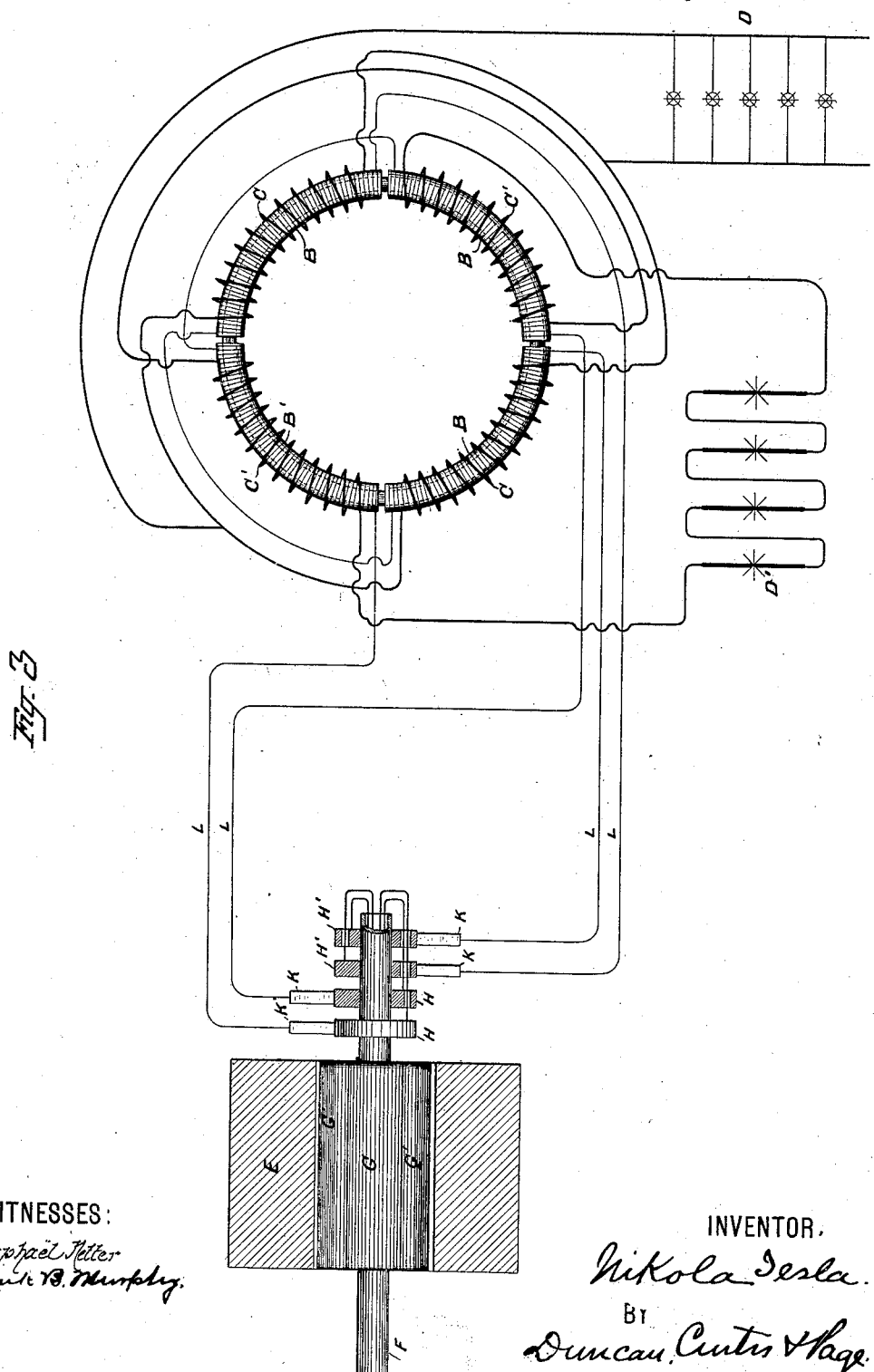

UNITED STATES PATENT OFFICE.

NIKOLA TESLA, OF NEW YORK, N. Y.

METHOD OF CONVERTING AND DISTRIBUTING ELECTRIC CURRENTS.

SPECIFICATION forming part of Letters Patent No. 382,282, dated May 1, 1888.

Original application filed December 23, 1887, Serial No. 258,787. Divided and this application filed March 9, 1888. Serial No. 266,757. (No model.)

*To all whom it may concern:*

Be it known that I, NIKOLA TESLA, from Smiljan, Lika, border country of Austria-Hungary, and now residing at New York, in the county and State of New York, have invented certain new and useful Improvements in Methods of Converting and Distributing Electric Currents, of which the following is a specification, this application being a division of an application filed by me December 23, 1887, Serial No. 258,787.

This invention relates to those systems of electrical distribution in which a current from a single source of supply in a main or transmitting circuit is caused to induce, by means of suitable induction apparatus, a current or currents in an independent working circuit or circuits.

The main objects of the invention are the same as have been heretofore obtained by the use of these systems—viz., to divide the current from a single source, whereby a number of lamps, motors, or other translating devices may be independently controlled and operated by the same source of current, and in some cases to reduce a current of high potential in the main circuit to one of greater quantity and lower potential in the independent consumption or working circuit or circuits.

The general character of the devices employed in these systems is now well understood. An alternating-current magneto-machine is used as a source of supply. The current developed thereby is conducted through a transmission-circuit to one or more distant points, at which the transformers are located. These consist of induction-machines of various kinds. In some cases ordinary forms of induction-coil have been used with one coil in the transmitting-circuit and the other in a local or consumption circuit, the coils being differently proportioned, according to the work to be done in the consumption-circuit—that is to say, if the work requires a current of higher potential than that in the transmission-circuit the secondary or induced coil is of greater length and resistance than the primary, while, on the other hand, if a quantity current of lower potential is wanted, the longer coil is made the primary. In lieu of these devices various forms of electro-dynamic induction-machines, including the combined motors and generators, have been devised. For instance, a motor is constructed in accordance with well-understood principles, and on the same armature are wound induced coils which constitute a generator. The motor-coils are generally of fine wire and the generator-coils of coarser wire, so as to produce a current of greater quantity and lower potential than the line-current, which is of relatively high potential to avoid loss in long transmission. A similar arrangement is to wind coils corresponding to those described on a ring or similar core, and by means of a commutator of suitable kind to direct the current through the inducing-coils successively, so as to maintain a movement of the poles of the core or of the lines of force which set up the currents in the induced coils.

Without enumerating the objections to these systems in detail, it will suffice to say that the theory or the principle of the action or operation of these devices has apparently been so little understood that their proper construction and use have, up to the present time, been attended with various difficulties and great expense. The transformers are very liable to be injured and burned out, and the means resorted to for curing this and other defects have invariably been at the expense of efficiency. I have discovered a method of conversion and distribution, however, which is not subject to the defects and objections to which I have alluded, and which is both efficient and safe. I secure by it a conversion by true dynamic induction under highly efficient conditions and without the use of expensive or complicated apparatus or moving devices, which in use wear out and require attention. This method consists in progressively and continuously shifting the line or points of maximum effect in an inductive field across the convolutions of a coil or conductor within the influence of said field and included in or forming part of a secondary or translating circuit.

In carrying out my invention I provide a series of inducing-coils and corresponding induced coils which, by preference, I wind upon a core closed upon itself—such as an annulus or ring—subdivided in the usual manner. The two sets of coils are wound side by side or superposed or otherwise placed in well-known ways to bring them into the most effective relations to one another and to the core. The inducing or primary coils wound on the core are divided into pairs or sets by the proper electrical connections, so that while the coils of one pair or set co-operate in fixing the magnetic poles of the core at two given diametrically-opposite points the coils of the other pair or set—assuming, for the sake of illustration, that there are but two—tend to fix the poles at ninety degrees from such points. With this induction device I use an alternating-current generator with coils or sets of coils to correspond with those of the converter, and by means of suitable conductors I connect up in independent circuits the corresponding coils of the generator and converter. It results from this that the different electrical phases in the generator are attended by corresponding magnetic changes in the converter; or, in other words, that as the generator-coils revolve the points of greatest magnetic intensity in the converter will be progressively shifted or whirled around. This principle I have applied under variously modified conditions to the operation of electro-magnetic motors, and in previous applications—notably in those having serial numbers 252,132 and 256,561—I have described in detail the manner of constructing and using such motors.

In the present application my object is to describe the best and most convenient manner of which I am at present aware of carrying out the invention as applied to a system of electrical distribution; but one skilled in the art will readily understand, from the description of the modifications proposed in said applications, wherein the form of both the generator and converter in the present case may be modified. In illustration, therefore, of the details of construction which my present invention involves, I now refer to the accompanying drawings.

Figure 1 is a diagrammatic illustration of the converter and the electrical connections of the same. Fig. 2 is a horizontal central cross-section of Fig. 1. Fig. 3 is a diagram of the circuits of the entire system, the generator being shown in section.

I use a core, A, which is closed upon itself—that is to say, of an annular, cylindrical, or equivalent form—and as the efficiency of the apparatus is largely increased by the subdivision of this core I make it of thin strips, plates, or wires of soft iron electrically insulated as far as practicable. Upon this core, by any well-known method, I wind, say, four coils, B B B' B', which I use as primary coils, and for which I use long lengths of comparatively fine wire. Over these coils I then wind shorter coils of coarser wire, C C C' C', to constitute the induced or secondary coils. The construction of this or any equivalent form of converter may be carried farther, as above pointed out, by inclosing these coils with iron—as, for example, by winding over the coils a layer or layers of insulated iron wire.

The device is provided with suitable binding-posts, to which the ends of the coils are led. The diametrically-opposite coils B B and B' B' are connected, respectively, in series, and the four terminals are connected to the binding-posts 1 2 3 4. The induced coils are connected together in any desired manner. For example, as shown in Fig. 3, C C may be connected in multiple arc when a quantity current is desired—as for running a group of incandescent lamps, D—while C' C' may be independently connected in series in a circuit including arc lamps D', or the like.

The generator in this system will be adapted to the converter in the manner illustrated. For example, in the present case I employ a pair of ordinary permanent or electromagnets, E E, between which is mounted a cylindrical armature on a shaft, F, and wound with two coils, G G'. The terminals of these coils are connected, respectively, to four insulated contact or collecting rings, H H H' H', and the four line-circuit wires L connect the brushes K bearing on these rings to the converter in the order shown. Noting the results of this combination, it will be observed that at a given point of time the coil G is in its neutral position and is generating little or no current, while the other coil, G', is in a position where it exerts its maximum effect. Assuming coil G to be connected in circuit with coils B B of the converter and coil G' with coils B' B', it is evident that the poles of the ring A will be determined by coils B' B' alone; but as the armature of the generator revolves, coil G develops more current and coil G' less until G reaches its maximum and G' its neutral position. The obvious result will be to shift the poles of the ring A through one quarter of its periphery. The movement of the coils through the next quarter of a turn, during which coil G' enters a field of opposite polarity and generates a current of opposite direction and increasing strength, while coil G is passing from its maximum to its neutral position, generates a current of decreasing strength and same direction as before, and causes a further shifting of the poles through the second quarter of the ring. The second half-revolution will obviously be a repetition of the same action. By the shifting of the poles of the ring A a power-dynamic inductive effect on the coils C C' is produced. Besides the currents generated in the secondary coils by dynamo-magnetic induction, other currents will be set up in the same coils in consequence of any variations in the intensity of the poles in the ring A. This should be avoided by maintaining the intensity of the poles constant, to accomplish which care should be taken in designing and proportioning the generator and in distributing the coils in the ring A and balancing their effect. When this is done, the currents are produced by dynamo-magnetic induction only, the same result being obtained as though the poles were shifted by a commutator with an infinite number of segments.

The apparatus by means of which this method of conversion is or may be carried out may be varied almost indefinitely. The specific form which I have herein shown I regard as the best and most efficient, and in another application I have claimed it; but I do not limit myself herein to the use of any particular form or combination of devices which is or may be capable of effecting the same result in a similar way.

What I claim is—

1. The method of electrical conversion and distribution herein described, which consists in continuously and progressively shifting the points or line of maximum effect in an inductive field, and inducing thereby currents in the coils or convolutions of a circuit located within the inductive influence of said field, as herein set forth.

2. The method of electrical conversion and distribution herein described, which consists in generating in independent circuits producing an inductive field alternating currents in such order or manner as to produce by their conjoint effect a progressive shifting of the points of maximum effect of the field, and inducing thereby currents in the coils or convolutions of a circuit located within the inductive influence of the field, as set forth.

NIKOLA TESLA.

Witnesses:
FRANK B. MURPHY,
FRANK E. HARTLEY.